United States Patent [19]

Page et al.

[11] Patent Number: 5,172,038

[45] Date of Patent: Dec. 15, 1992

[54] PEAK CURRENT CONTROL IN THE ARMATURE OF A DC MOTOR DURING PLUG-BRAKING AND OTHER HIGH CURRENT CONDITIONS

[75] Inventors: Stephen L. Page; Paul P. McCabe, both of Greene, N.Y.

[73] Assignee: Raymond, Greene, N.Y.

[21] Appl. No.: 684,753

[22] Filed: Apr. 15, 1991

Related U.S. Application Data

[63] Continuation-in-part of Ser. No. 532,139, Jun. 4, 1990, abandoned, which is a continuation of Ser. No. 237,044, Aug. 29, 1988, abandoned.

[51] Int. Cl.$^5$ .............................................. H02P 3/00
[52] U.S. Cl. ................................... 318/373; 318/370; 318/380
[58] Field of Search ............... 318/373, 375, 376, 280, 318/284, 371, 380, 261, 370, 493

[56] References Cited

U.S. PATENT DOCUMENTS

| | | | |
|---|---|---|---|
| 3,826,962 | 7/1974 | Morton et al. | 318/376 |
| 3,911,342 | 10/1975 | Herwig | 318/373 |
| 3,958,163 | 5/1976 | Clark | 318/373 |
| 3,995,204 | 11/1976 | Konrad et al. | 318/373 X |
| 4,092,577 | 5/1978 | Markham | 318/370 |
| 4,104,571 | 8/1978 | Gurwicz et al. | 318/380 |
| 4,240,015 | 12/1980 | White | 318/493 X |
| 4,529,919 | 7/1985 | Melocik et al. | 318/373 |
| 4,804,893 | 2/1989 | Melocik | 318/373 X |
| 4,933,611 | 6/1990 | Albanesius et al. | 318/380 X |

Primary Examiner—A. Jonathan Wysocki
Attorney, Agent, or Firm—Salzman & Levy

[57] ABSTRACT

The present invention features an electric motor control system combination with at least one electric motor having a field winding and an armature winding connected in series. The system also includes a first power terminal, a second power terminal, a current-limiting resistor, and a current sensor. The current-limiting resistor and the current sensor are connected in series between the first power terminal and the second power terminal. A contactor has a contact operable to shunt the current-limiting resistor. A microcomputerized control connected to the contactor and the current sensor governs the contractor to shunt the current-limiting resistor when the electric motor is not in a plugged condition. The contactor is operative when the current sensor detects a substantially zero current through the electric motor. The microcomputerized control continuously regulates power being supplied to the electric motor and provides optimum armature current in all operative modes of the electric motor, including a braking mode. This results in smooth braking that is accomplished with a minimum of armature heating.

3 Claims, 6 Drawing Sheets

5,172,038

PEAK CURRENT CONTROL IN THE ARMATURE OF A DC MOTOR DURING PLUG-BRAKING AND OTHER HIGH CURRENT CONDITIONS

RELATED PATENT APPLICATIONS

This application is a continuation-in-part of previously filed U.S. patent application Ser. No. 07/532,139, filed Jun. 4, 1990, entitled "Electric Motor Control System," now abandoned, which was a continuation of previously filed U.S. patent application Ser. No. 07/237,044, filed Aug. 29, 1988, entitled "Electric Motor Having A Microcomputerized Control System," now abandoned.

FIELD OF THE INVENTION

The invention relates to peak current control within the armature of a DC motor during high current conditions and more particularly to limiting the peak currents in the armature of a DC motor of a material handling vehicle during all operational conditions including plug-braking.

BACKGROUND OF THE INVENTION

Fork lift trucks and other material handling vehicles place great strain upon their motor systems during hard braking and maximum accelerating and decelerating conditions. It is during these operational conditions that the DC motor of the fork lift vehicle experiences peak current conditions in the armature. It is important to limit the peak currents flowing through the DC armature in order to reduce heating therein and to improve the efficiency of the operation of the fork lift truck.

It is most common to apply plug-braking in DC motors used in material handling vehicles. Such a technique is illustrated in U.S. Pat. No. 3,826,962, issued to Morton et al on Jul. 30, 1974, entitled "Control of Electric Motors for Battery-Operated Vehicles." This system avoids overheating when "regeneration" or plug-braking is utilized. A coil is used to sense plugging current which is then used to energize a contactor. The field current is regulated to keep the generated current constant as motor speed slows, thereby providing constant braking torque. In the DC motor of this patented system, the heating effects are small. This is particularly true when contrasted to DC motors employed in fork lift truck operations.

When a fork lift vehicle plug-brakes, it brings a 12,000 pound vehicle to a stop in an average of three seconds. This dynamic stopping condition equates to 19,750 ft-lbs of energy, or 26,800 joules. This energy must be dissipated almost entirely in the armature circuit. This is a great amount of energy to be dissipated and would ordinarily cause severe heating in the armature of the DC motor, were it not for the present invention.

It should also be observed that the aforementioned braking condition of the vehicle is on the average occurring 100 times every hour of operation. When this enormous amount of heat energy is also accompanied by other losses during normal driving and acceleration, it is no wonder that this serious problem must be eliminated or at least effectively controlled.

The present invention controls peak armature DC motor current during the entire operation of the vehicle, one hundred percent of the time. A current sensor is utilized to provide both magnitude and polarity of armature current. A processor utilizes this information to control both a switching contactor and pulse switching means at an accelerated rate that only computer processing can handle. The inventive control system eliminates or removes as much heat from the armature during plug-braking as possible and yet provides an adequate braking effort to the vehicle.

In prior art systems, velocity control or constant braking force limitations have been placed upon the operational system to improve efficiency of the operation. However, none of these systems has regulated current through the armature of the DC motor for the purposes of this invention, viz., protecting the armature from overheating. A prior art system that used velocity feedback to regulate applied power for acceleration and deceleration is shown in U.S. Pat. No. 3,466,524, issued to Cooper on Sep. 9, 1969, for a "Speed Taper Brake Modulation System." In this system, the braking effort is controlled as a function of speed. A special motor with an extra winding is utilized for controlling motor impedance and thus current. This is equivalent to a variable speed DC motor system.

In the aforementioned patent to Morton et al, the contactor and resistor control is analogous to an on/off light switch. By contrast, the present invention utilizes an SCR dimmer control. Whereas the Morton et al system merely switches on and off depending upon the presence of plugging current, the present invention senses the motor current with its polarity changes almost instantly. The invention uses this information to switch the contactor "cold", with little or no current passing through the tips. The plugging current is directed through a resistor. The pulse width and frequency of the current is precisely varied at the SCR switch to regulate the current through the armature.

The advantages of the present invention are that 75 to 80% of the energy once dropped in the armature is now dissipated by the system's external resistor during plug-braking. This greatly reduces the operating temperature of the motor, which experiences this braking condition on the average of 100 times per hour.

Contactor tip wear is also greatly reduced due to precise switching of the contactor as a function of armature current, wherein little or no current passes through the tips during the braking.

The system removes the resistor from the circuit during conditions that do not require plug-braking. This increases the recirculating current during normal acceleration and driving. The result is that the delivered net torque of the motor is improved. Thus, the entire system is more efficient over its entire operation.

SUMMARY OF THE INVENTION

In accordance with the present invention, there is provided an electric motor control system comprising in combination at least one electric motor having a field winding and an armature winding connected in series. The system also comprises a first power terminal, a second power terminal, a current-limiting resistor, and a current sensor. The current-limiting resistor and the current sensor are connected in series between the first power terminal and the second power terminal. A contactor has a contact operable to shunt the current-limiting resistor. A microcomputerized control operatively connected to the contactor and the current sensor governs the contactor to shunt the current-limiting resistor when the electric motor is not in a plugged condition. The contactor is operative when the current sensor detects a substantially zero current through the electric motor. The microcomputerized control continuously regulates power being supplied to the electric motor and provides optimum armature current in all operative modes of the electric motor including a braking mode. This results in smooth braking that is accomplished with a minimum of armature heating.

BRIEF DESCRIPTION OF THE DRAWINGS

A complete understanding of the present invention may be obtained by reference to the accompanying drawings, when considered in conjunction with the subsequent detailed description, in which.

Similar reference characters refer to similar parts in each of the several views.

DETAILED DESCRIPTION OF THE PREFERRED EMBODIMENT

Figure 1:
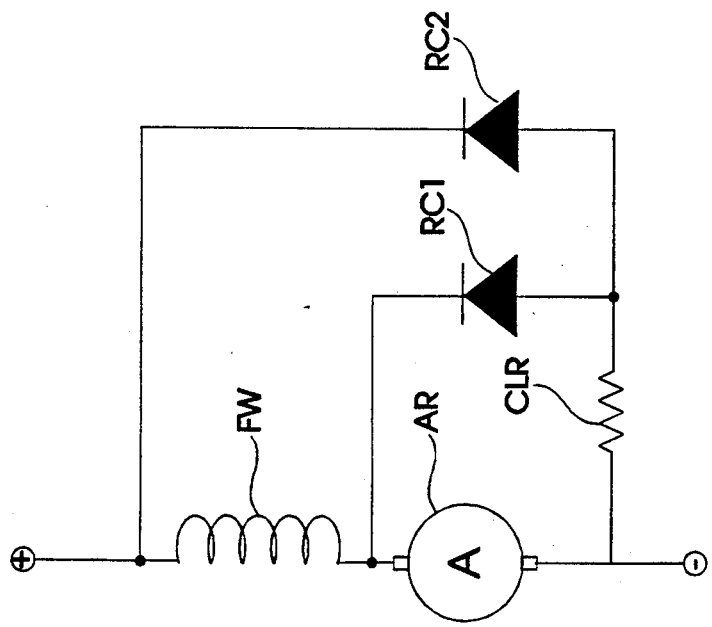
FIG. 1 is a schematic circuit diagram illustrating one form of prior art plugging circuits.

Referring to FIG. 1 of the drawings, there is shown an elementary electric motor circuit including a series connected field winding FW and an armature AR, connected in series between a source of pulsed direct current having terminals designed as + and −. A current-limiting resistor CLR is connected across the armature via a first plugging diode RC1, and resistor CLR is connected across the armature and the field winding via a second diode RC2. In this arrangement, the resistor CLR is permanently connected to the motor circuit. Hence it not only limits the plugging current but also limits the recirculating or "free-wheeling" current which flows through the plugging diodes. The torque boost that the motor receives when the motor field collapses after the removal of each pulse through the motor is reduced because the resistor reduces the current. The net effect is to reduce the response of the system and to produce a greater amount of wasted heat energy. The limiting resistor CLR may be eliminated if the resistance of the wire connections alone is adequate to limit the plugging current.

Figure 2:
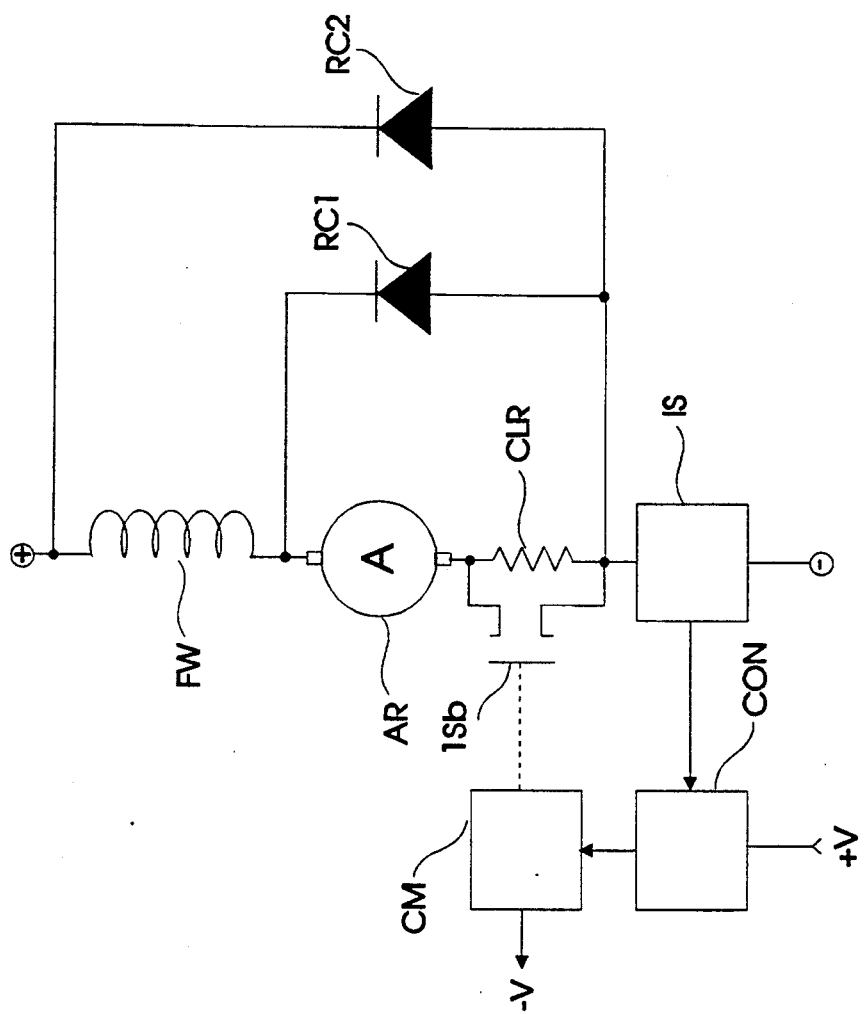
FIG. 2 is a schematic circuit diagram of an improved plugging circuit according to a first embodiment of the invention.

FIG. 2 shows the resistor CLR wired in series with the armature and the field winding and selectively shunted by a contact 1Sb of a heavy-duty contactor. Thus the resistor CLR is placed in the plugging and recirculating circuit paths but it is effectively switched out by contact 1Sb when the system is in its normal operating mode. The resistor and shunting contact are equally effective in the circuit branch to diodes RC1 and RC2. This arrangement maximizes the torque boost from the collapsing fields after each current pulse and also reduces the wasted heat energy. When plugging is required, the contactor opens its contacts and the shunt is removed from resistor CLR, thereby placing the resistor in the circuit. The contact operating mechanism CM which may be a conventional solenoid, for example, is governed by a control circuit CON which receives signals from a current sensor IS. The contacts such as 1Sb are thus opened and closed only when the motor current is at or near zero, thus substantially reducing the wear or erosion of the contacts caused by operations while conducting heavy currents.

Figure 3:
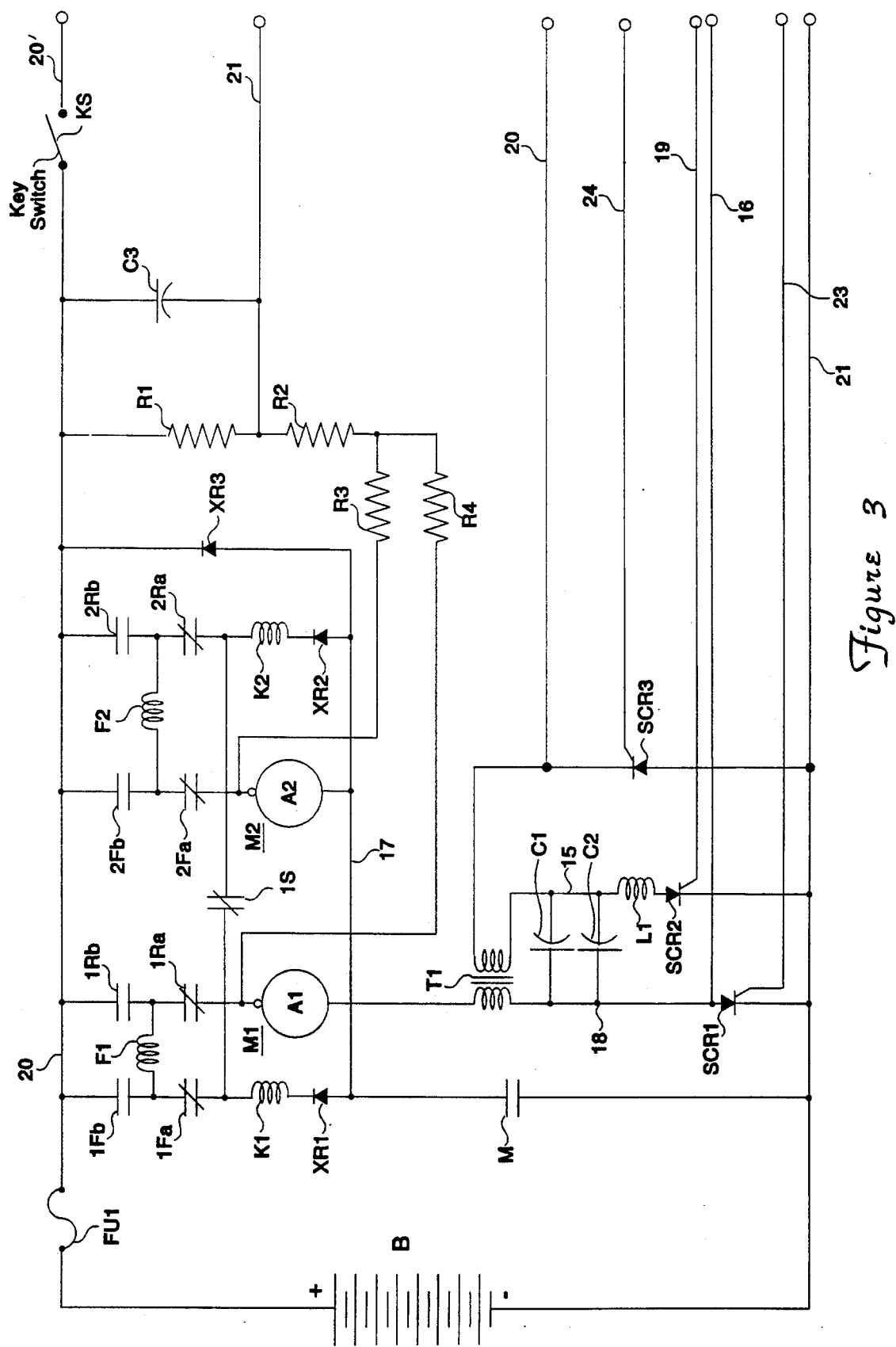
FIG. 3 is a schematic diagram showing the motor control circuit of a prior art system.

A prior art control circuit is shown in FIG. 3. Operation of the circuit thereshown need not be described herein in detail. In brief, two series-field motors M1 and M2 are connected in parallel with each other and in series with a battery B and a pulse-width modulated thyristor SCR1. The series fields F1 and F2 of the motors are switched to determine motor torque direction. When thyristor SCR1 is turned on, current flows from battery B through the motor fields and motor armatures and through thyristor SCR1. When thyristor SCR1 is turned off, by energizing commutating thyristor SCR2, the inductive flux collapse in the motors causes current flow through "free-wheeling" diode XR3. That current flow significantly contributes to motor torque and motor efficiency.

When plugging occurs, large currents circulate in two loops which include diode XR1, relay coil K1 and armature A1 as one loop; and diode XR2, relay coil K2 and armature A2 as the other loop. The use of such plugging loops decreases the amount of battery power which otherwise would be used during plugging. It lessens the amount of commutating capacity required and thereby decreases expense. It causes plugging torque to vary less drastically with motor speed.

The normally-closed contacts of shorting contactor 1S are held open during normal running but are made to close during plugging when the two motors are acting as two series-field generators, for reasons of stability. Series-field generators cannot be safely connected in parallel without an interconnection of the type provided by the contacts 1S. De-energization of the 1S contactor coil occurs in response to sufficient current flowing through the coil of plugging relay K1 or through the coil of plugging relay K2. The large currents which circulate in armatures A1 and A2 during plugging often tend to cause severe motor overheating and sometimes damage.

Various simple means for limiting armature current are generally well known. It is readily apparent that one could wire resistors in series with and adjacent to the two armatures in FIG. 3. However, that would disadvantageously tend to waste power both during the "on" time of thyristor SCR1 and during the "off" time while inductive field collapses cause current to circulate through "free-wheeling" diode XR3.

Figure 4:
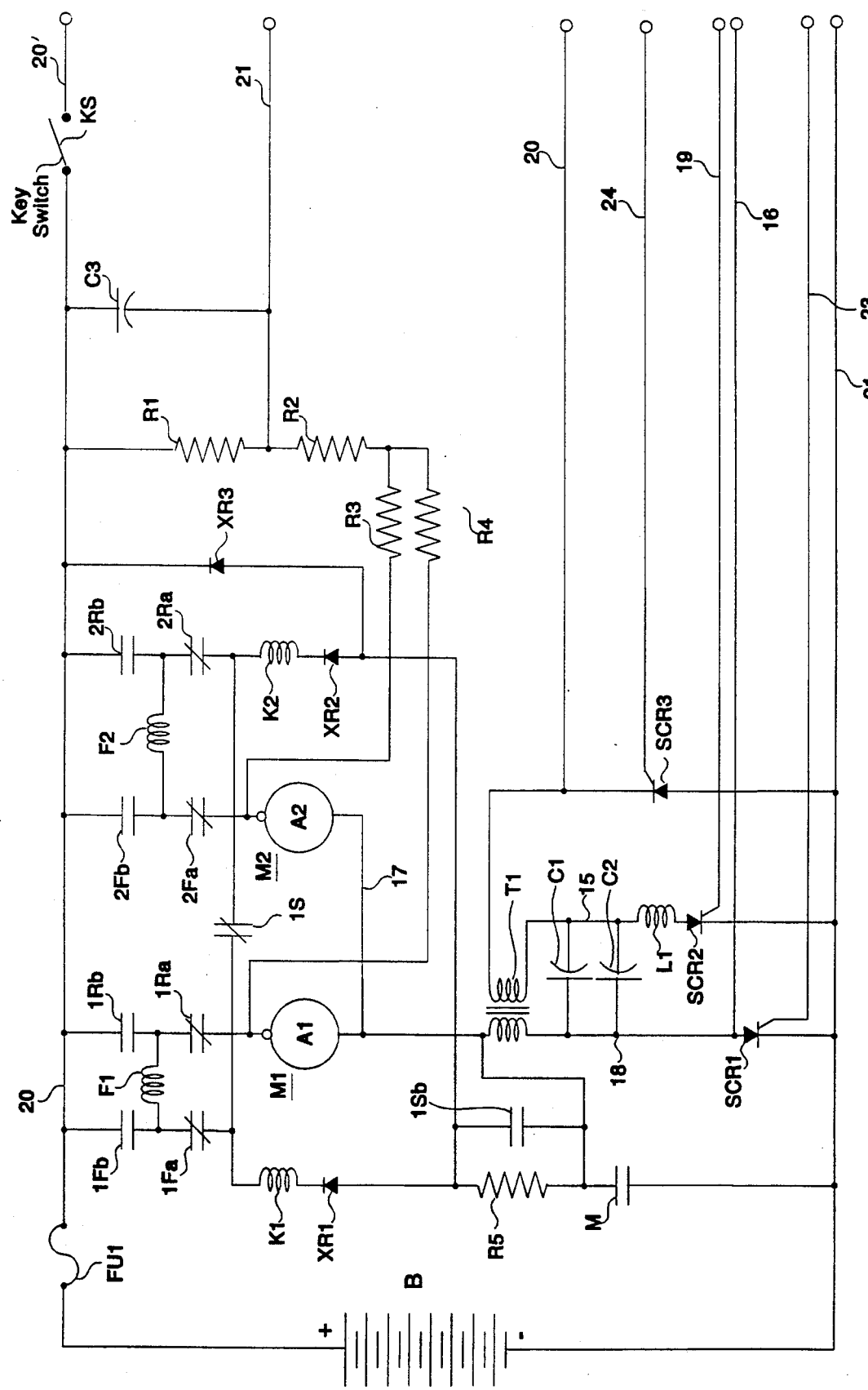
FIG. 4 is a schematic diagram showing the motor control circuit of FIG. 3, modified to incorporate the present invention.

FIG. 4 is a modification of the arrangement shown in FIG. 3, described above, showing the changes required to provide an electric motor control system in accordance with one embodiment of the present invention.

In FIG. 4 a resistor R5 is shown inserted in series between the two armature loops and the main thyristor SCR1. A normally-open contact pair 1Sb is connected to opposite ends of resistor R5. The contact pair 1Sb may comprise an added pair of contacts on the contactor 1S shown in both FIGS. 3 and 4. During normal running the coil of contactor 1S is energized, so that contacts 1Sb are closed, shorting across resistor R5 and effectively removing that resistor from the circuit. Thus it will be apparent that resistor R5 has no effect during normal running and does not interfere with circulation of current through diode XR3. However, while plugging is occurring and contacts 1Sb are open, the insertion of resistor R5 in series in both of the two armature loops clearly decreases the current which circulates in those loops.

The insertion of resistor R5 during plugging decreases the current which flows through the motor armature and the main thyristor SCR1. Hence, the amount of braking torque is decreased from that amount which otherwise is available during plugging with the prior art circuit of FIG. 3. However, that decrease can be easily compensated for by mere adjustment of the thyristor duty-cycles which occur for given control positions during plugging.

Figure 5:
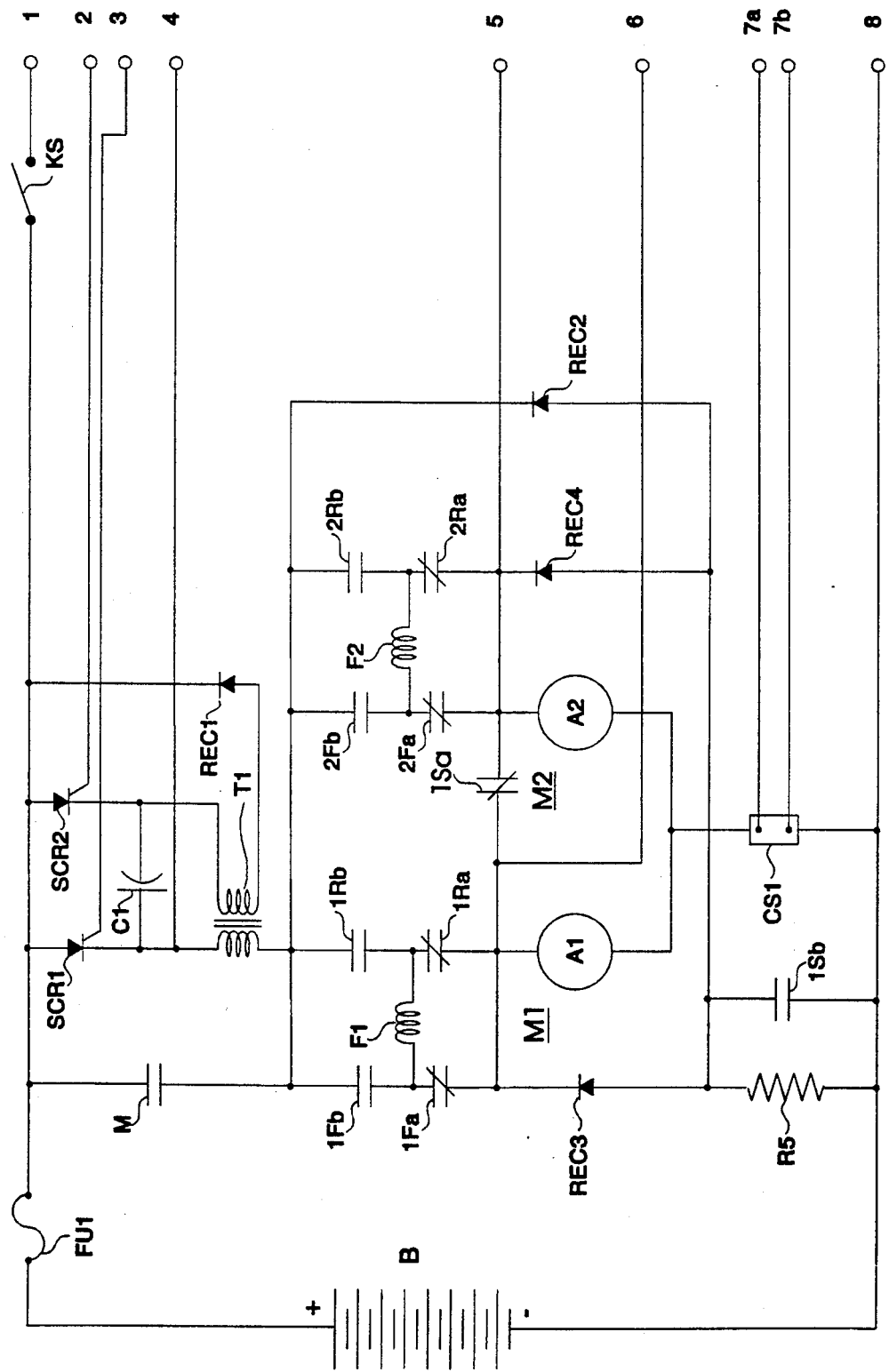
FIGS. 5, 6 and 7 taken together provide a schematic diagram illustrating a preferred embodiment of the present invention comprising an electric motor control circuit including a microcomputer.
Figure 6:
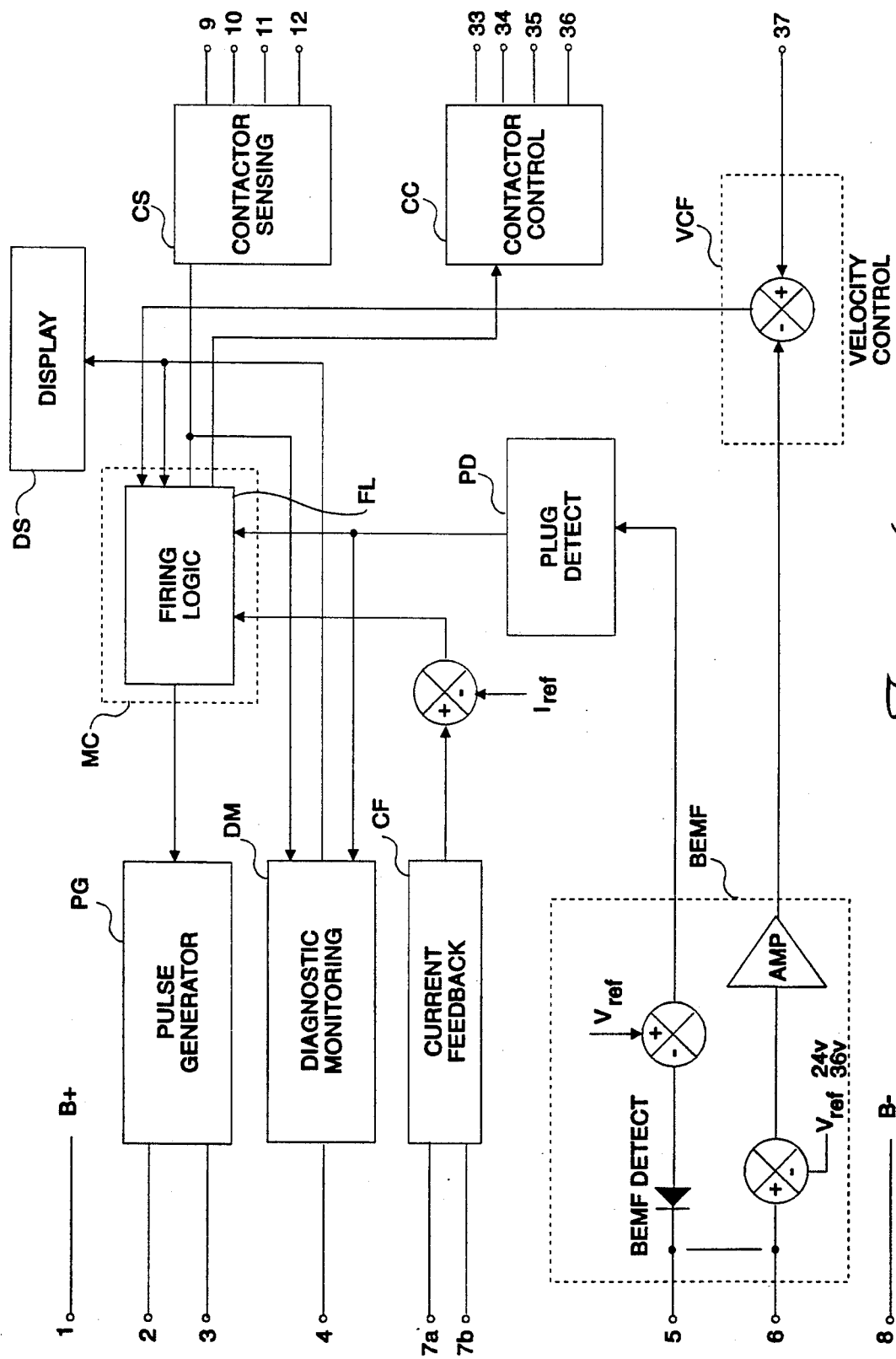
Figure 6:
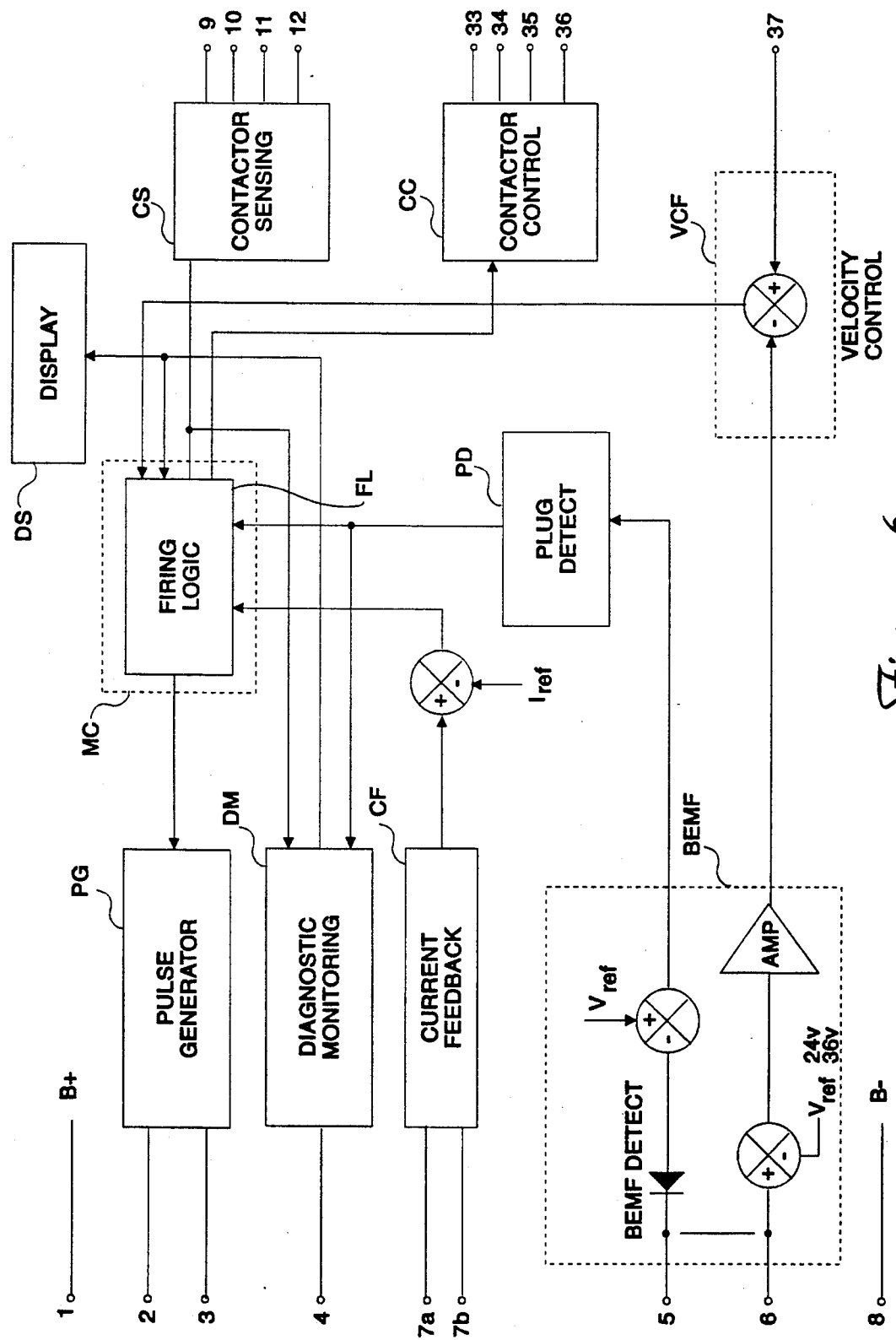
Figure 7:
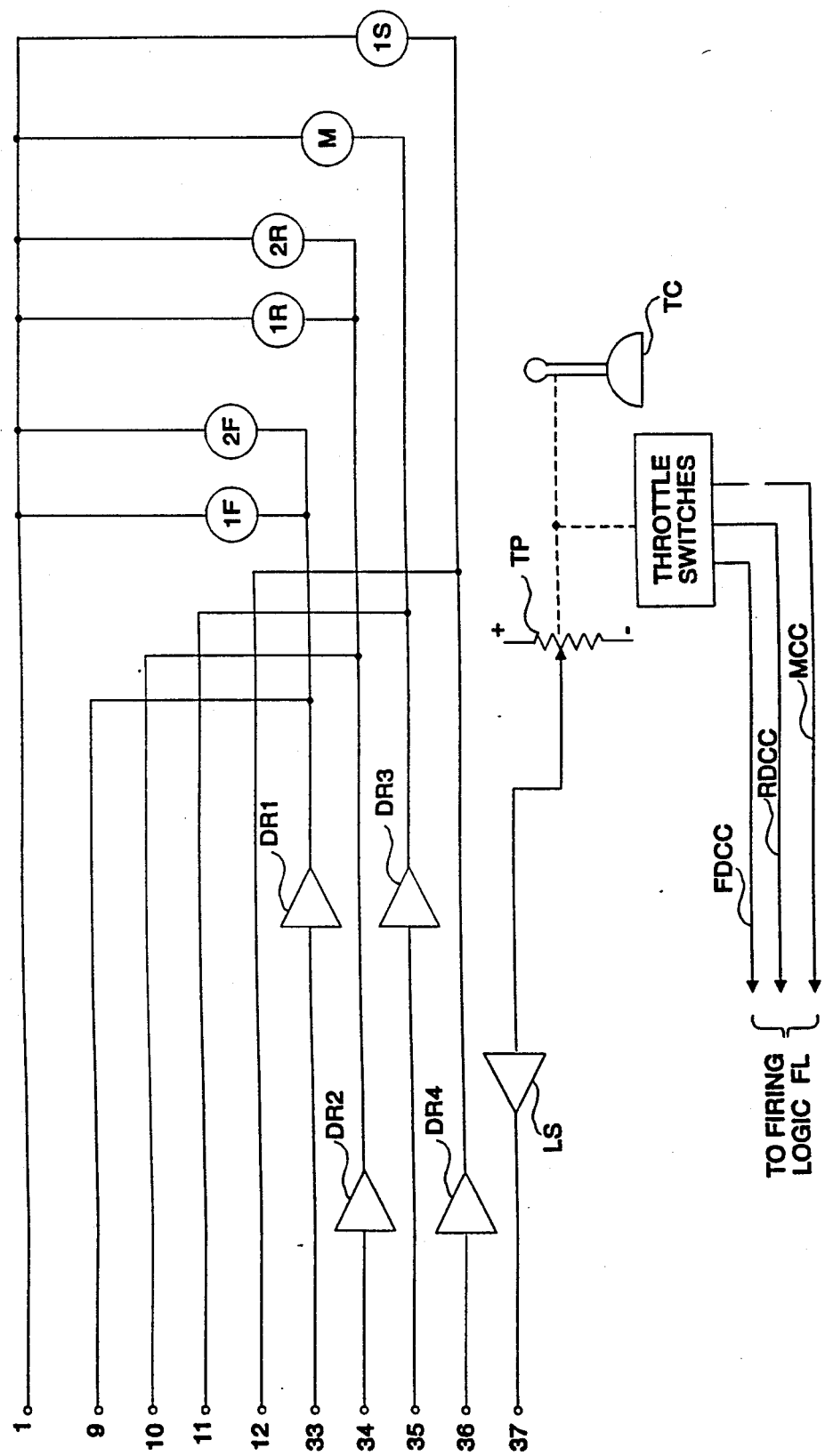

The preferred embodiment of the invention is illustrated in FIGS. 5, 6 and 7 arranged in sequence from left to right. The electrical connections between the figures are given corresponding numerical reference characters for matching purposes. This embodiment includes a microcomputer motor controller MC (FIG. 6), which may comprise, for example, part of a Model MS-100 motor controller sold by Sigma Elektroteknisk A/S of Vestby, Norway. The functions provided by the controller MC are shown within the dashed line in FIG. 6. An operator travel control handle TC (FIG. 7) is connected to operate a spring-loaded potentiometer TP within forward and reverse ranges separated by a neutral position. The voltage on the wiper of potentiometer TP is applied to conventional filtering and level-shifting circuits indicated by LS to provide an acceleration request voltage, which is then supplied to the Velocity Control Function VCF.

A feedback voltage from the motor armature(s) (back electro-motive force) is applied via connections 5 and 6 to a Back EMF Detect Function BEMF. It is an analog voltage that varies directly with the rotational speed of the motor(s). The Back EMF Detect Function BEMF receives the tachometer-like signal from the motor(s) and conditions it for further use. The motor voltage can be either positive or negative depending on the operational mode of the system. It is positive when motoring in a normal drive mode; it is negative when the truck is moving in a given direction and plugging to slow the truck to a stop or to change direction.

The velocity control circuit VCF is a velocity feedback summing junction for motor control. If the speed command voltage is less than the motor feedback voltage, no net positive command signal is sent on to the next stage. If the command voltage is greater than the motor voltage, a positive error command signal is sent to the Firing Logic function FL in the microcomputer MC to indicate a need for the SCRs to be pulsed and for more voltage to be applied to the motors.

When the voltage across the motor(s) reverses, the motors are generating current. This condition is detected by the BEMF function. A negative voltage is detected by the Plug Detect function PD and informs the Firing Logic function FL and Diagnostic Monitoring function DM that the vehicle is in the plug mode of operation.

It is important to know when the plugging sequence has started so that the SCRs can be pulsed at a slower rate for a smooth braking action. When traveling in the forward direction, if the operator changes the speed control handle position so that it passes through neutral and into the opposite direction, plugging will occur. The more the handle is moved in the reverse direction, the faster the pulsing rate of the SCRs and the harder will be the braking effort. This is known as proportional plugging.

After the handle moves through neutral into the reverse direction, the forward contactor(s) 1F and 2F will be deenergized under the control of the Contactor Control function CC which controls the contactor operating coils via connections 33, 34, 35 and 36 and the associated driver circuits DR1–DR4. When the current through the motor armature has reduced to zero or very near zero, the reverse contactor(s) 1R and 2R will be energized. The status of the contactors is detected by the Contactor Sensing function CS via the connections 9–12. The polarity of the field reverses. With the existing rotation of the armature from the truck movement, the motor becomes a generator. The braking torque is described by the expression, $$T_b = K_t \times I_a$$

where,
$T_b$ = Braking torque
$K_t$ = Motor torque constant
$I_a$ = Armature current The current through the armature can be described by, $$I_a = -(V_a + V_{emf})/R$$

where,
$V_a$ = Applied Armature Voltage
$V_{emf}$ = Rotational Generated Voltage
R = Resistance of the Armature Circuit To increase the braking effort, the main SCR (SCR1) is pulsed at a slow rate by the outputs from the Pulse Generator function PG via connectors 2 and 3. The Pulse Generator function PG is in turn governed by the Firing Logic function FL which also governs the Contactor Control function CC. The voltage $V_a$ supplied to the armature adds to the voltage generated from the rotating armature $V_{emf}$. The higher voltage generates a larger current $I_a$ and therefore more braking torque $T_b$. The value of resistance can be increased with an external component resistor. The greater the resistance the less the current. However this can be balanced against the duty cycle of SCR1 to apply a greater voltage $V_a$. Therefore, by balancing the resistor sizing against the SCR1 duty cycle, an optimum combination can be found that gives smooth braking effort and reduces armature heating.

With this design, a resistance of 0.030 ohms (two times the armature resistance of 0.015 ohms) provides sufficient braking torque and reduced average heat dissipated in the armature. Wattage in the armature in one instance was reduced from an average of 2700 to 1800 watts per plug with the same voltage applied.

Another feedback used to control the net command signal, which is used to generate pulses for thyristors SCR1 and SCR2, is the current signal from the shunt CS1 located in the armature circuit of the motors. A voltage of 0 to 220 millivolts, for example, is differentially detected, filtered, amplified and supplied to the Firing Logic function FL. References are set for normal drive and plugging mode $I_{ref}$ which provide a point to indicate when a maximum has been exceeded. The control algorithm for the microcomputer MC is designed to limit maximum current. It is desirable to allow maximum current whenever it is called for to provide strong acceleration. Therefore, the current feedback is used to limit maximum armature current in all modes of operation.

After a command signal has been processed through the velocity control function, the resultant error signal (speed command) is sent to the Firing Logic function FL. This function uses the microcomputer MC to determine the correct firing sequence for thyristors SCR1 and SCR2. It analyzes information composed of speed command, current feedback, contactor state, plugging state and system diagnostic condition. From this the control algorithm generates the correct firing duty cycle and frequency.

Normal driving will generate a firing sequence as described below which gives maximum current and voltage sourcing to the motor. This function is also the central operations control element. When an event occurs that is outside the limits, this function will slow or stop further SCR firing. The events shown below can cause the alteration of the firing sequence.

a) If maximum current has been exceeded, the firing sequence will turn off until the current is within acceptable limits.

b) If plugging operation is detected, the frequency and duty cycle will be reduced to approximately 10% of the maximum seen during normal driving.

c) If the contactors are in a transition mode, the firing sequence will stop until that action is complete.

d) If the diagnostic monitoring function senses a system error, the firing logic stops the pulse generation and removes commands to the contactor control.

Pulse width modulation and frequency modulation are achieved by controlling two gate drive signals to the SCRs. The main SCR (SCR1) is gated on by one pulse supplied via connection 3. This allows current to flow from the battery through SCR1, the transformer T1 primary, the forward 1F, 2F or reverse 1R, 2R contactor tips, through the field windings F1, F2, the motor armatures A1, A2, the current shunt CS1 and back to the battery.

A voltage change at the primary winding of transformer T1 is coupled to the secondary winding with a phase reversal and step-up ratio of approximately 1:4. The voltage across the secondary winding provides the potential for the capacitor C1 to charge to approximately 2.5 times battery voltage. At this time, SCR2 is turned off and charging rectifier REC1, after providing a charging path for capacitor C1, will hold the charge.

To turn off SCR1, thyristor SCR2 is gated on which will draw current away from SCR1, allowing it to turn off. This happens by SCR2 conducting hard for about 100 microseconds because of the B+ potential on the anode and the large relative negative potential on the cathode side due to the capacitor C1 charge. While SCR2 is conducting hard, equalizing the charge on capacitor C1, current is drawn away from the path through SCR1 for a time sufficient for it to stop conducting and turn off.

This commutation action is repeated at various rates and frequencies to control the speed of the motor.

When a speed command signal is received from the analog circuits, the pulse generation function PG will send out pulses to the SCRs until one of several things happen:

a) the command signal is removed or reduced;
b) the maximum speed-limit has been achieved;
c) the maximum current level has been reached;
d) the "M" range contactor energizes; or
e) the diagnostic circuits indicate an operational failure.

The frequency and pulse width selection is designed to develop sufficient motor torque and maximize power amplifier efficiency. The frequency range may be 0-250 Hz and the pulse width from 1-99%, for example.

The status of contactors 1F, 2F, 1R, 2R, M and 1S is monitored continuously by the Contactor Sensing function CS via connections 9, 10, 11 and 12, to provide signals in response to the voltage across the contactor coils which shifts from about 2 volts when the coils are energized to about B+ voltage when deenergized.

Contactor position status is sent to the Firing Logic function FL for inputs to the decision algorithm described previously.

Throttle switches are used by the operator's speed controller, shown in FIG. 7, to call for a directional contactor to change state when the operator moves the handle from neutral to either direction, a first output FDCC (forward direction contactor control) is generated for forward motion and a second output RDCC (reverse direction contactor control) is generated for reverse motion. As the handle continues to move towards the maximum speed position, the same controller will call for the "M" contactor to energize when the handle has moved approximately 80% of its full stroke and an output is provided on line MCC.

The contactor control coil drivers, DR3 for "M" and DR1-DR2 for Forward/Reverse, switch two coils each directly. These drivers act as disconnect devices if the Firing Logic function FL determines that the contactor(s) should not operate. The switching means are additional drivers in series with the contactor control. They will call for the contactor(s) to be energized, but the coil drivers in the contactor control have ultimate control. This redundant contactor switching technique gives the operator an extra margin of safety should a failure occur.

The equalization contactor 1S is also controlled by the contactor control function. It is used to short the fields of the two motors together during the plugging operation and to switch the plugging resistor in and out of the armature circuit. The contactor tips that short the motor fields 1Sa are normally closed when no power is applied. The tips 1Sb that switch resistor R1 are normally open.

Resistor R5 is used to dissipate the heat developed during the plugging operation. When the armature becomes a generator, it supplies current through current shunt CS1, resistor R5, plugging rectifiers REC3 and REC4 and back to the armature. The resistor limits the peak current and absorbs some of the energy instead of all of it going into the armature. When the plugging sequence is finished, the contactor tips 1Sb close, which takes the resistor out of the circuit. It is not advantageous to limit recirculating current during normal drive operation. Each time SCR1 turns off, the magnetic fields created by current through the motor field windings collapse. That collapse generates a current through the armatures and back to each field through rectifier REC2. This current gives an additional torque boost to the motor output and improves acceleration. Removing the resistor R5 by contactor switching improves that operation and eliminates wasted energy across the resistor when not needed.

The output from the contactor control function to control the equalization contactor 1S is a low level digital signal. An external driver DR4 is used to switch the voltage for the contactor coil.

The firing logic determines the state or quadrant in which the system is operating and then energizes the appropriate contactor(s). There are seven operational states for the truck, as follows:

| OPERATIONAL STATE | CONTACTOR USED |
| --- | --- |
| Neutral-No travel speed | None |
| Forward Motion-Normal Drive | 1F, 2F |
| Forward Motion-Normal Drive "M" Range | 1F, 2F, M |
| Forward Motion-Plugging | 1R, 2R, 1S (Deenergized) |
| Reverse Motion-Normal Drive | 1R, 2R |
| Reverse Motion-Normal Drive "M" Range | 1R, 2R, M |
| Reverse Motion-Plugging | 1F, 2F, 1S (Deenergized) |

Inputs are sent to the diagnostic monitoring function from the contactor sensing and plug detect functions as well as from the SCR chopper circuit via connection 4. It is the purpose of this function to test for proper event sequencing and operating conditions continuously. The result of this testing is sent to the Firing Logic function FL for system implementation and is shown in a single alphanumeric display DS. This display DS will show both status and fault codes which are used by truck service personnel to check operational readiness or for troubleshooting.

Because of the harsh mechanical and electrical environment, the diagnostic monitoring function must be tolerant of transients that can exist. Whenever a fault code is generated, it is tested two more times before the display shows that code and action is taken.

The action required after a fault code appears is to stop generating pulses for the SCRs and disable all contactors. For critical fault codes, resetting the system requires the B+ connection to be interrupted by turning the keyswitch KS off, then on again.

For less critical fault codes the system can be reset up to three times by returning the speed control handle to the neutral position. After that, the reset must take place by resetting the keyswitch.

From all of the foregoing it will be apparent that the invention provides a new and useful electric motor control system specifically directed to an improved arrangement for plugging a pair of series-connected direct current motors by a common current-limiting resistor, which is shunted out of the circuit except when plugging action is desired. The operation of the shunting contactor is governed by means which determines that the current through the motors is at or near zero when the contactor is operated, thus reducing wear and arcing of the shunting contacts.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented by the subsequently appended claims.

What is claimed is:

1. An electric motor control system comprising in combination two electric motors with the field winding and armature of each in series, a first power terminal, a second power terminal, a current limiting resistor, a current sensing means, said two electric motors effectively connected in parallel to said first and second power terminals and a current limiting resistor and said current sensing means being connected in series with said armatures and said second power terminal, a pulsing means connected to said power terminals for supplying pulse width modulated direct current power to said first and second power terminals, said pulsing means comprising at least one thyristor means, a diode connected across both of said electric motors in parallel and poled to pass motor current when either one of the electric motors is coasting and the motor field collapses, a contactor means having a contact operable to shunt the current limiting resistor, and a microcomputerized control means operatively connected to said contactor means and said current sensing means for governing said contactor means to shunt said current limiting resistor when the electric motors are not in a plugged condition, said contactor means being operative when the current sensing means detects a substantially zero current through said electric motors, said microcomputerized control means controlling said pulsing means to smoothly vary a conduction duty cycle of said of said thyristor means to provide optimum armature current in all operative modes of said electric motors, including a braking mode whereby a smooth braking is accomplished with a minimum of armature heating, whereby said electric motor control system selectively inserts resistance across the armatures via said microcomputerized control means, when said electric motors are in a plugged condition, thus obtaining the benefit of a reduced plugging current through said armature resulting in reduced armature heating but otherwise operates said electric motors with a high free wheeling current during a driving mode, thus providing an additional torque boost ordinarily unavailable with fixed resistor shunted electric motors, said microcomputerized control means further reducing frequency and duty cycles of said armature current to approximately ten percent of a maximum for normal driving modes.

2. The electric motor control system as claimed in claim 1, wherein said microcomputerized control means has inputs corresponding to speed command, motor current feedback, contactor state, and plugging state, and having outputs generated by a control algorithm solved by said microcomputerized control means in response to said inputs for regulating the power being supplied to said electric motor.

3. The electric motor control system as claimed in claim 2, wherein the power supplied to said motor is pulse-width modulated direct current and the frequency and duty cycles of the pulses are regulated by the outputs of said microcomputerized control means.

* * * * *